United States Patent
Fössel et al.

(10) Patent No.: US 6,784,922 B1
(45) Date of Patent: Aug. 31, 2004

(54) IMAGE SCANNING METHOD

(75) Inventors: Siegfried Fössel, Erlangen (DE); Lothar Trunk, Wiebersbrunn (DE); Heino Möller, Erlangen (DE); Erwin Drachsler, Offenbach (DE)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/673,334
(22) PCT Filed: May 11, 1999
(86) PCT No.: PCT/EP99/03288
§ 371 (c)(1),
(2), (4) Date: Jan. 22, 2001
(87) PCT Pub. No.: WO99/60334
PCT Pub. Date: Nov. 25, 1999

(30) Foreign Application Priority Data

May 18, 1998 (DE) .......................... 198 22 249

(51) Int. Cl.[7] .................................................. H04N 7/18
(52) U.S. Cl. ....................................................... 348/144
(58) Field of Search .................................. 348/144, 146, 348/147, 148, 218, 36–39, 229, 269; H04N 7/18

(56) References Cited

U.S. PATENT DOCUMENTS 6,256,057 B1 * 7/2001 Mathews et al. ............ 348/144
6,320,611 B1 * 11/2001 Pepin ........................... 348/147

* cited by examiner

Primary Examiner—Tung T. Vo
(74) Attorney, Agent, or Firm—Schiff Hardin LLP

(57) ABSTRACT

An area, such as an area of the earth's surface, is scanned by a scanner, such as an infrared line scanner, which is moved over the area at different heights and at different speeds. An overscan factor is determined in accordance with the height and speed of the scanner over the scanned area. A first image is centered, and an offset vector between the first image and a subsequently scanned second image is calculated in accordance with an image offset. The first and second images are aligned with one another in accordance with the offset vector. The image content of the aligned images are averaged with one another in overlapping image areas defined by the overscan factor.

8 Claims, 8 Drawing Sheets

*FIG. 8*
*FIG. 9*

IMAGE SCANNING METHOD

The present invention relates to an image scanning method according to the preamble of patent claim 1.

Such a method is employed, in particular, during aerial reconnaissance of a terrain. For this purpose, in addition to daylight cameras, an infrared camera is arranged in an airplane or in a container arranged under the airplane, said infrared camera allowing a thermal image of the overflown terrain to be recorded when visibility is poor and at night. The recorded images can be displayed to the pilot in the cockpit on a TV monitor or they can be recorded on a video recorder for later evaluation.

EP 0 503 103 B1, which was granted to the applicant, illustrates and describes an infrared imaging system which, by means of a suitably designed detector arrangement and an electronic zoom, also enables the recording of thermal images during low-altitude flight over a large scanning angle without image distortion.

The IR line scanners (IRLS=Infrared Line Scanner) used in the known imaging system join together the strip images—recorded by means of a rotating scanning mirror on a detector bank—without any gaps only when the scanning rate, that is to say the rotational speed of the scanning mirror, is matched to the flying altitude and flying speed of the airplane. The strip images overlap (overscan) if the flying altitude exceeds the optimum value or if the speed is below the optimum value. If the flying altitude is too low or the speed is too high, then gaps are produced between the strips. The overlap factor that is to say the overscan factor, specifies the ratio of the height of the overlapping area to the height of the image strip.

In order to obtain gap- and overlap-free recordings, either the image frequency, that is to say the scanning rate of the rotating mirror, has to be adapted to the flying altitude and the airplane speed or the airplane is forced to adhere exactly to flying altitude and speed.

Although it is actually possible to adapt the scanning rate of the scanning mirror, in terms of control technology this adaptation is difficult to control owing to the moving masses of the mirror wheel.

In addition to the overscan, a statistical image offset is also produced both in the horizontal direction and in the vertical direction on account of tolerances in the IR line scanner (jitter, synchronization problems).

The object of the present invention, therefore, is, taking account of the abovementioned fault sources, to specify a method which improves the quality of the recorded images in such a way as to enable evaluation.

This object is achieved in accordance with the defining features of patent claim 1. Further advantageous refinements of the method according to the invention can be gathered from the dependent claims.

The method according to the invention will be described below using an exemplary embodiment with reference to the figures of the accompanying drawing, in which:

FIG. 8 shows an image of the recorded terrain with corrected overscan;

FIG. 9 shows an image of the recorded terrain, the overscan and the offset being corrected;

Figure 1:
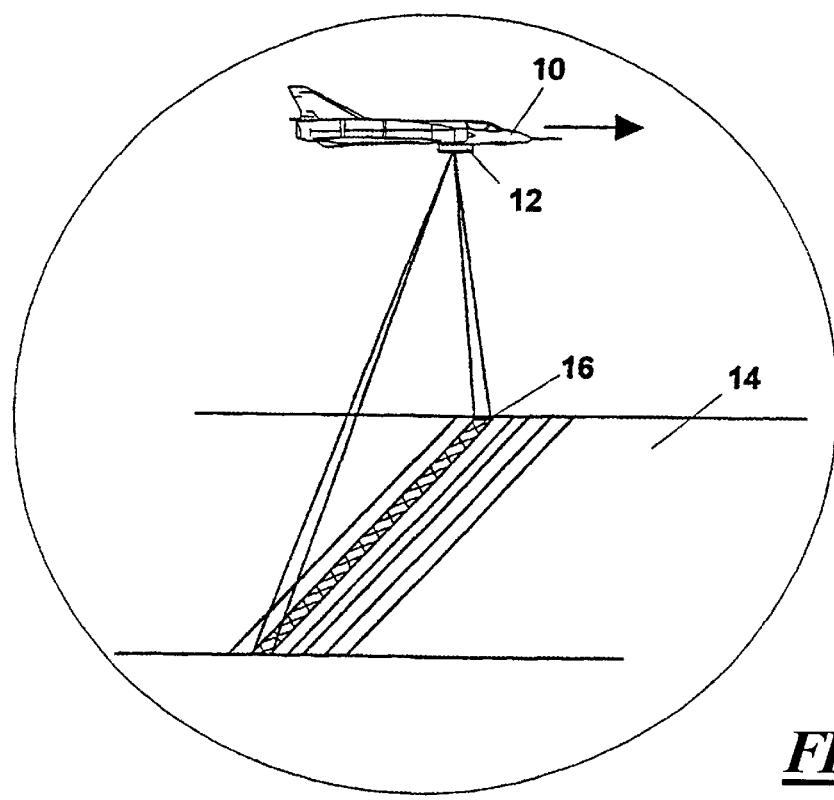
FIG. 1 shows the principle of airplane aerial reconnaissance.

As shown in FIG. 1, a container 12 is arranged under an airplane 10, an IR line scanner with associated electronics being arranged in said container in order to scan the terrain 14 located underneath in strips 16 and to generate a thermal image.

Figure 2:
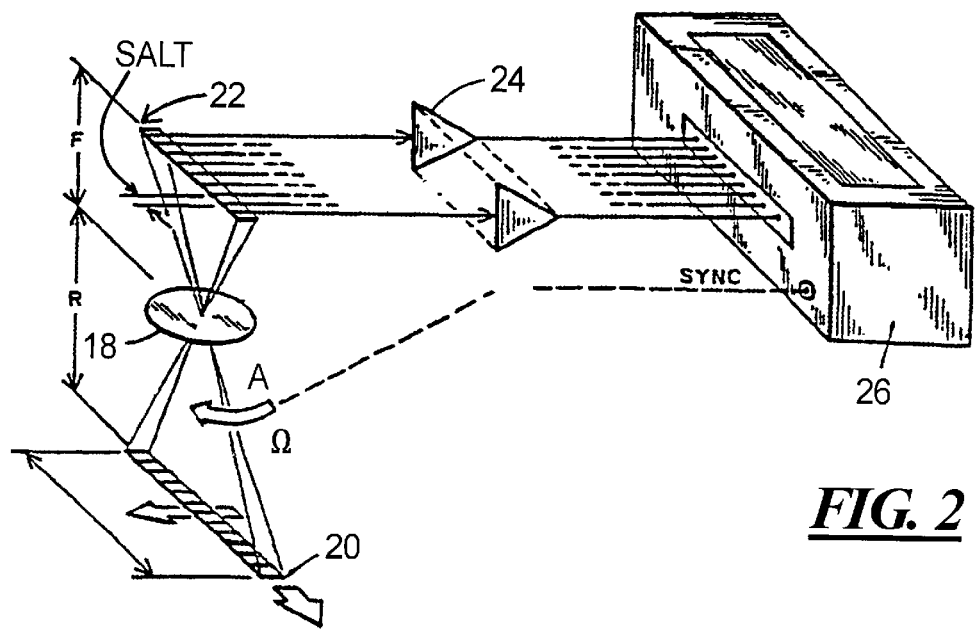
FIG. 2 shows the essential elements of an IRLS arrangement.

FIG. 2 shows the principle of IR strip scanning. An optical arrangement 18 images a terrain strip 20 on a detector arrangement 22 comprising n elements. The optical arrangement 18 may comprise a pivotable lens or a mirror wheel arrangement, as is known in the prior art. The signals of the detectors 22 are fed via amplifiers 24 to an electronic and recording unit 26, which, for its part, controls the scanning angle A and the scanning rate $\Omega$ of the optical arrangement 18.

Figure 3:
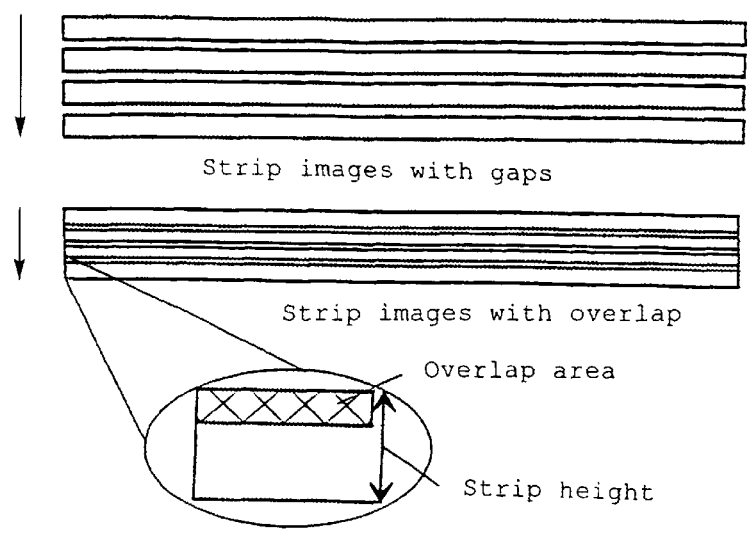
FIG. 3 shows different strip images.

FIG. 3 reveals that, depending on the height and speed of the airplane, given a constant scanning rate of the optical arrangement, strip images are produced with gaps or with an overlap. In the case of the present invention, for a predetermined reconnaissance height of between e.g. 2000 and 8000 feet, the scanning rate is chosen such that no gaps are produced, rather an overlap always occurs, particularly at relatively great heights. Consequently, given a predetermined strip height, an area is always produced which overlaps with an image strip already recorded beforehand, that is to say the so-called overlap area, as is illustrated by the lower image detail in FIG. 3.

Figure 4:
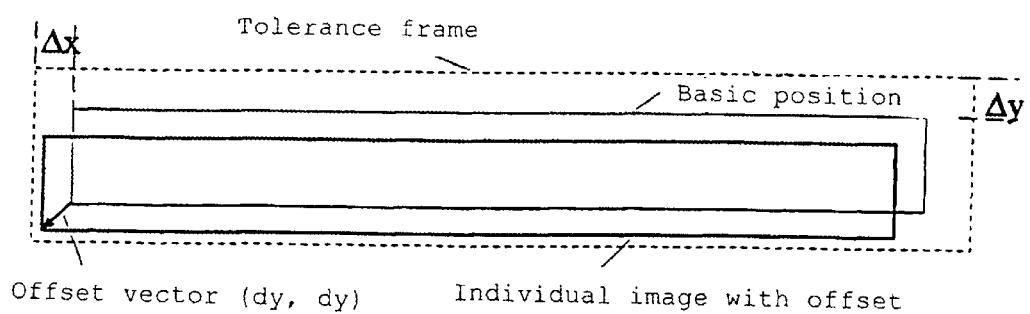
FIG. 4 shows an individual image having an offset.

As shown in FIG. 4, an additional statistical image offset $\Delta x$ in the horizontal and $\Delta y$ in the vertical is produced as a result of tolerances in the IR line scanner, such as e.g. jitter, erroneous synchronization, etc. In this case, the offset of the individual image relative to the desired basic position can be described in a tolerance frame by an offset vector dx, dy. Realistic values are in this case an offset by ±1 pixel in the vertical and ±3 pixels in the horizontal.

Figure 5:
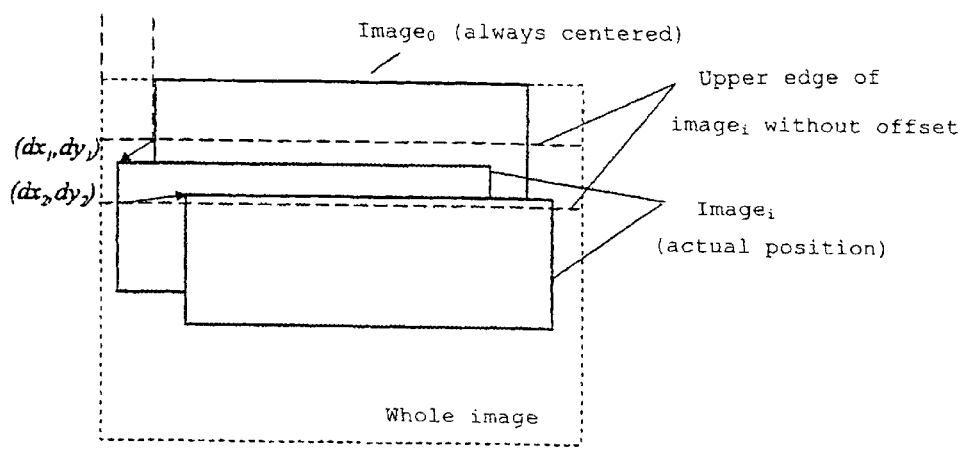
FIG. 5 shows a plurality of images for elucidating a step of the method according to the invention.

As shown in FIG. 5 and according to the method of the invention, an initial image (image$_0$) is now centered in the full image. The offset vectors $dx_i$, $dy_i$ are calculated for the subsequent images (image$_i$) and the images are aligned with the initial image. In accordance with the overlap area partial images which, except for the noise, have identical image contents are blanked out from the images which are now aligned with one another.

Figure 6:
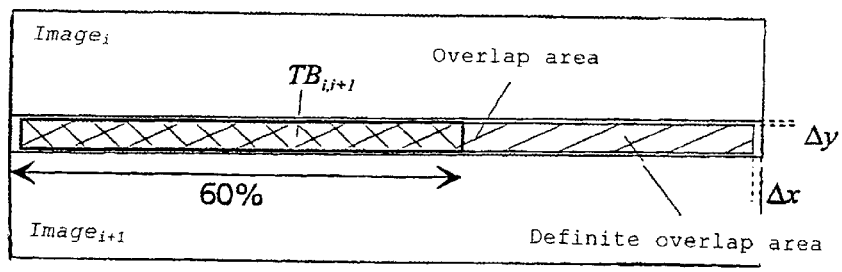
FIG. 6 shows overlapping images for elucidating a further step of the method according to the invention.

This is illustrated in FIG. 6. As shown in this figure, the overlap area determined by the overscan factor is reduced for the purpose of taking account of the statistical offset by a tolerance frame $\Delta x$ on the right and on the left in each case and by a tolerance frame $\Delta y$ at the top and at the bottom in each case. This reduction produces the definite overlap area. The height of the overlap area must accordingly exceed 2 $\Delta x$; otherwise a definite overlap area is not present.

For reasons of the limited computation time available, only an adjustable percentage of the width of the definite overlap area is taken into account. In the case illustrated in FIG. 6, only 60% of the overlapping partial images having a comparable image content are processed by computer. In the image overlap area, averaging is performed for each pixel. Averaging over N partial images leads to an improvement in the signal/noise ratio by the factor $\sqrt{N}$.

The method according to the invention deliberately allows an overlap of the image contents (overscan) up to a specific percentage. The elimination of this overscan leads to an improvement in the image quality by averaging over the pixels which are multiply assigned to an image dot. The image quality is also additionally improved by preceding elimination of the image offset.

Figure 7:
FIG. 7 shows an image of a recorded terrain with overscan and an offset of the strip images.
Figure 10:
FIG. 10 shows an image of the recorded terrain with corrected overscan and offset and implemented averaging of the image content.

FIGS. 7 to 10 clearly illustrate the effects of the method according to the invention. FIG. 7 shows the image of a terrain recording without treatment of the overscan and offset that are present. The overscan is eliminated according to FIG. 8. Finally both the overscan and the offset are corrected in FIG. 9 and averaging over the pixels assigned to identical image dots was additionally performed in FIG. 10.

Figure 11:
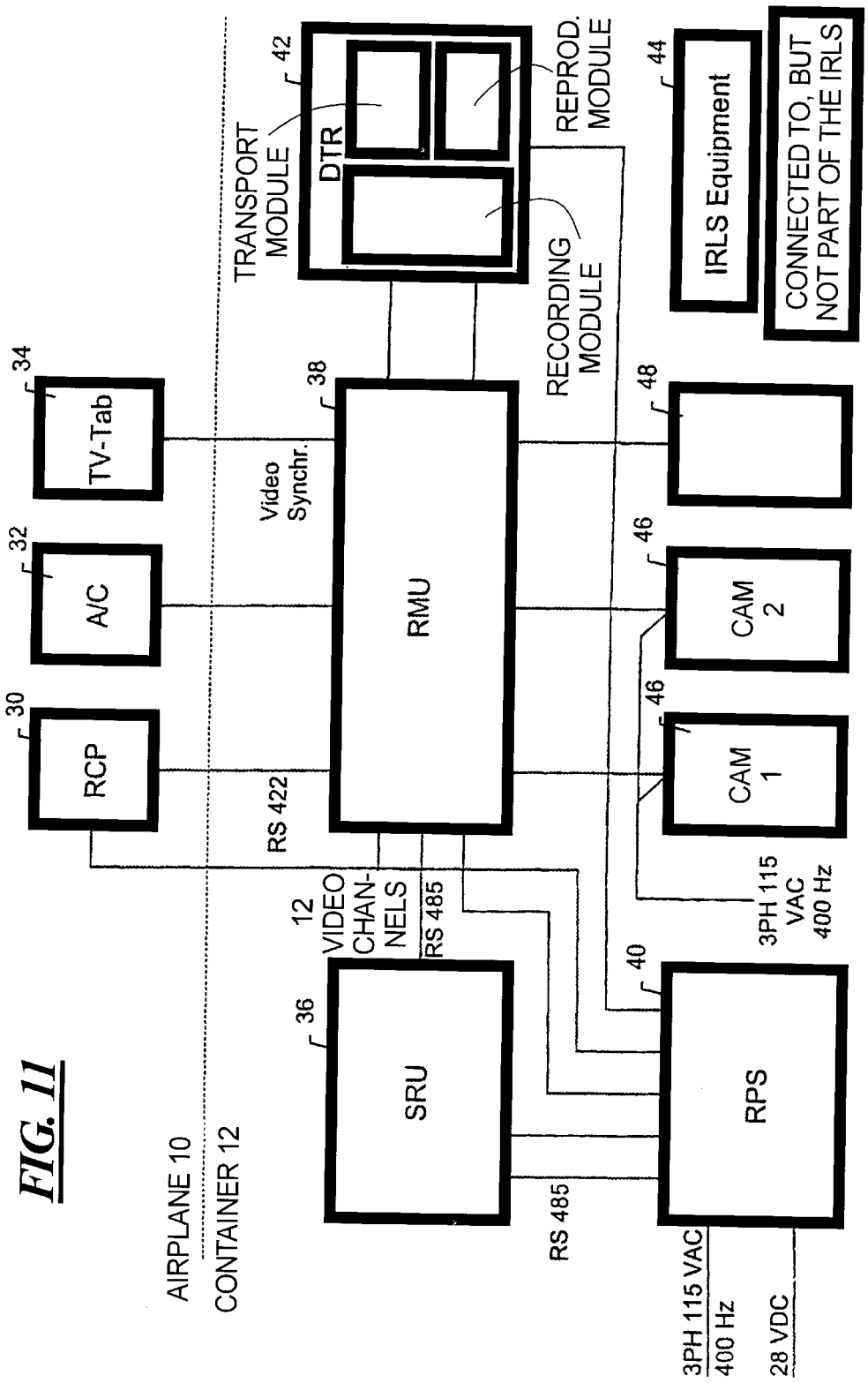
FIG. 11 shows a block diagram of the hardware of the entire system.
Figure 12:
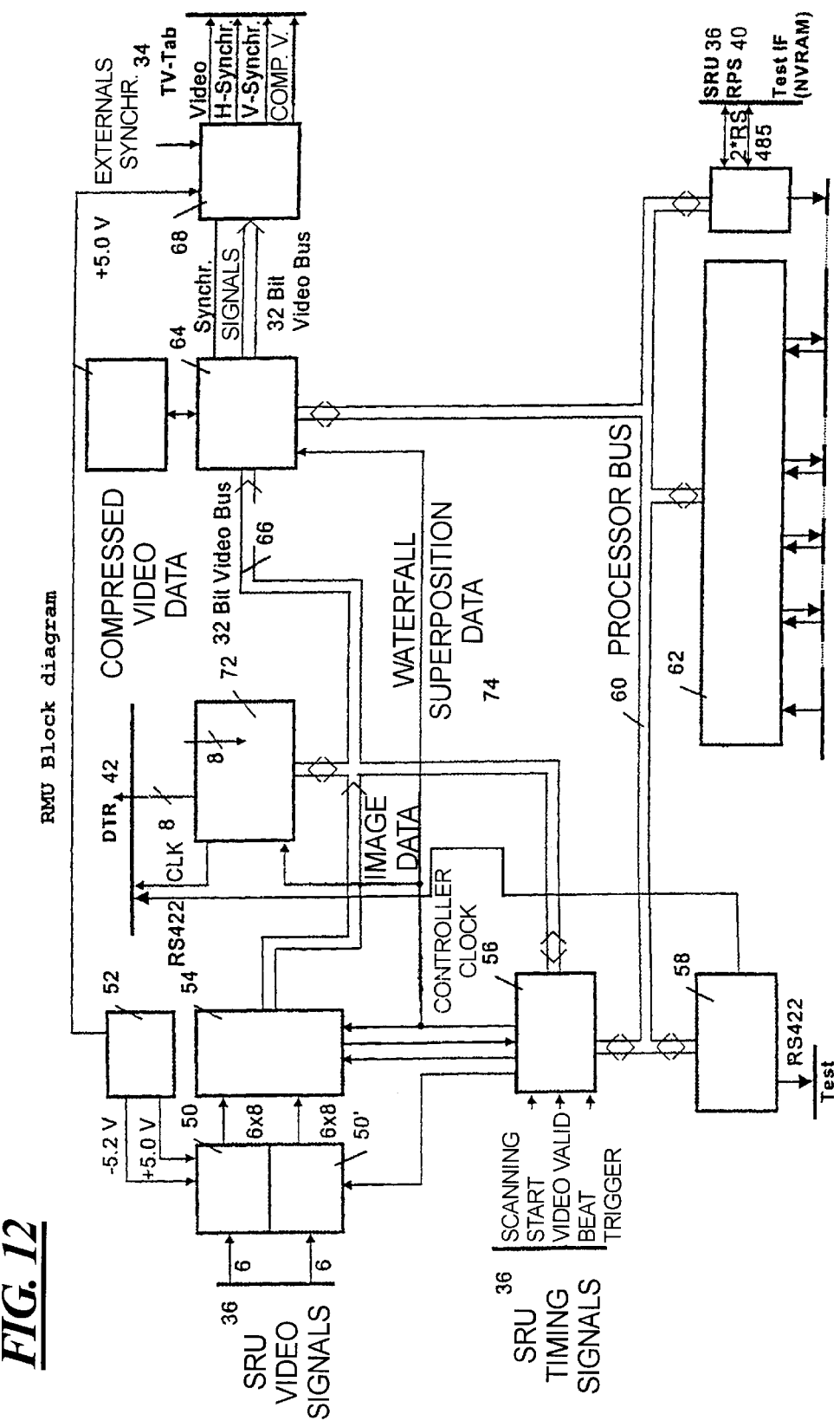
FIG. 12 shows a block diagram of the hardware of the reconnaissance management unit in which the method according to the invention is realized.

FIGS. 11 and 12 illustrate block diagrams of the hardware in which the present invention is realized.

In FIG. 11, the components which are illustrated above the dashed line are situated in the airplane 10 and the components illustrated below the dashed line are situated in the container 12. A reconnaissance control panel 30 (RCP), a block 32 for airplane data, such as, in particular, speed and height, and a television monitor 34 are arranged in the airplane 10.

A scanner receiver unit 36 (SRU), a reconnaissance management unit 38 (RMU), a reconnaissance power supply 40 (RPS) and a digital tape recorder 42 (DTR) are situated in the container 12. The gray hatched components together form the IR line scanner system 44 (IRLS=Infrared Line Scanner System), while the other blocks do not form part of said system. The other blocks additionally comprise, in the container 12, two daylight cameras 46, 46' and diverse apparatuses illustrated by the block 48, such as e.g. an air-conditioning system, lockable windows for the cameras, etc.

FIG. 12 illustrates a block diagram of the RMU 38. The SRU 36 supplies per image strip in 12 channels in each case 12 288 image dots which, combined in 6 channels in each case, are fed to two analog/digital converters 50, 50', which code the image dots per pixel with 8 bits in each case. A power supply 52 feeds the analog/digital converters 50, 50' in this case. The digital parallel data are fed in 2×6 channels to a parallel/serial converter 54, which converts them into serial data. Timing signals from the SRU 36 are fed to an input controller 56, which supplies the control clock pulse for the analog/digital converter and the parallel/serial converter and also for further components. A processor 58 is connected via a processor bus 60 to the input controller 56, an interface 62 to the airplane, to the cameras, etc., and to an image processing unit 64. The processor 58 is fed, inter alia, the speed and the height of the airplane and it calculates from these the overlap factor (overscan) of the successively recorded image strips. The image processing unit 64 contains an image processor and a graphics processor for inserting supplementary data into the image data, this not being specifically illustrated. The image processor is fed, via a 32-bit video bus 66, the image data in the form of moving image data (waterfall) and it shifts the continuously incoming strip images with the aid of the respectively calculated offset vector in such a way that they are aligned with one another and it averages the image content in the overlapping area. The images treated in this way are displayed on the TV monitor 34 via an output image buffer 68 or frozen in a still image buffer 70.

On the other hand, provision is made for recording the strip images on the DTR 42 as they are recorded with overlap and offset after treatment in a data compression/decompression unit 72. Both in the case of recording on the DTR 42 and in the case of display on the TV monitor 34, data which are fed to the processor 58 e.g. from the interface 62 and which are fed via a superposition data bus 74 are superposed on the images of the terrain. The data recorded on the DTR 42 can be read out again and, before being displayed on the TV monitor 34, for the purpose of image improvement, are then subjected to the above-described treatment with regard to overlap and offset.

What is claimed is:

1. A method for the image scanning of an area, in particular the earth's surface, by a scanner, in particular an infrared line scanner, which is moved over the area at different heights and at different speeds, the method comprising the following steps:

a) determining an overscan factor in accordance with the height and the speed of the scanner over the scanned area;

b) positioning a first image (image$_0$) in a centered manner;

c) determining an offset vector ($dx_i$, $dy_i$) for subsequently scanned images (image$_i$, image$_{i+i}$, ... ) in accordance with their image offset ($\Delta x$, $\Delta y$);

d) aligning the images with one another with the aid of the offset vectors; and e) averaging the image content of the images which are aligned with one another in image areas with an overlap defined by the overscan factor.

2. The method as claimed in claim 1, further comprising defining a definite overlap area in which the calculation of the offset vector is performed.

3. The method as claimed in claim 2, wherein the determining of an offset vector, for reasons of limited computation time, comprises determining the offset vector only over part of the definite overlap area.

4. The method as claimed in claim 1, wherein the averaging of the image content comprises averaging the image content of the images only in the overlap areas.

5. A method for processing image content of images taken by a camera of image areas where the camera is moved over the image areas at different heights and at different speeds, the method comprising:

a) collecting at least first and second images;

b) determining an overlap factor with respect to an overlapping portion of the first and second images, wherein the overlap factor is determined in accordance with the height and the speed of the camera over the image areas; and, c) averaging only the image content of the first and second images in the overlapping portion defined by the overlap factor.

6. The method of claim 5 wherein the first and second images comprise corresponding first and second image strips.

7. The method of claim 5 wherein the averaging of only the image content of the first and second images in the overlapping portion comprises:

aligning the first and second images relative to one another in accordance with an offset vector dependent upon tolerances in the camera; and, averaging only the image content of the aligned first and second images in the overlapping portion defined by the overlap factor.

8. The method of claim 7 wherein the first and second images comprise corresponding first and second image strips.

* * * * *